Patented Oct. 8, 1929

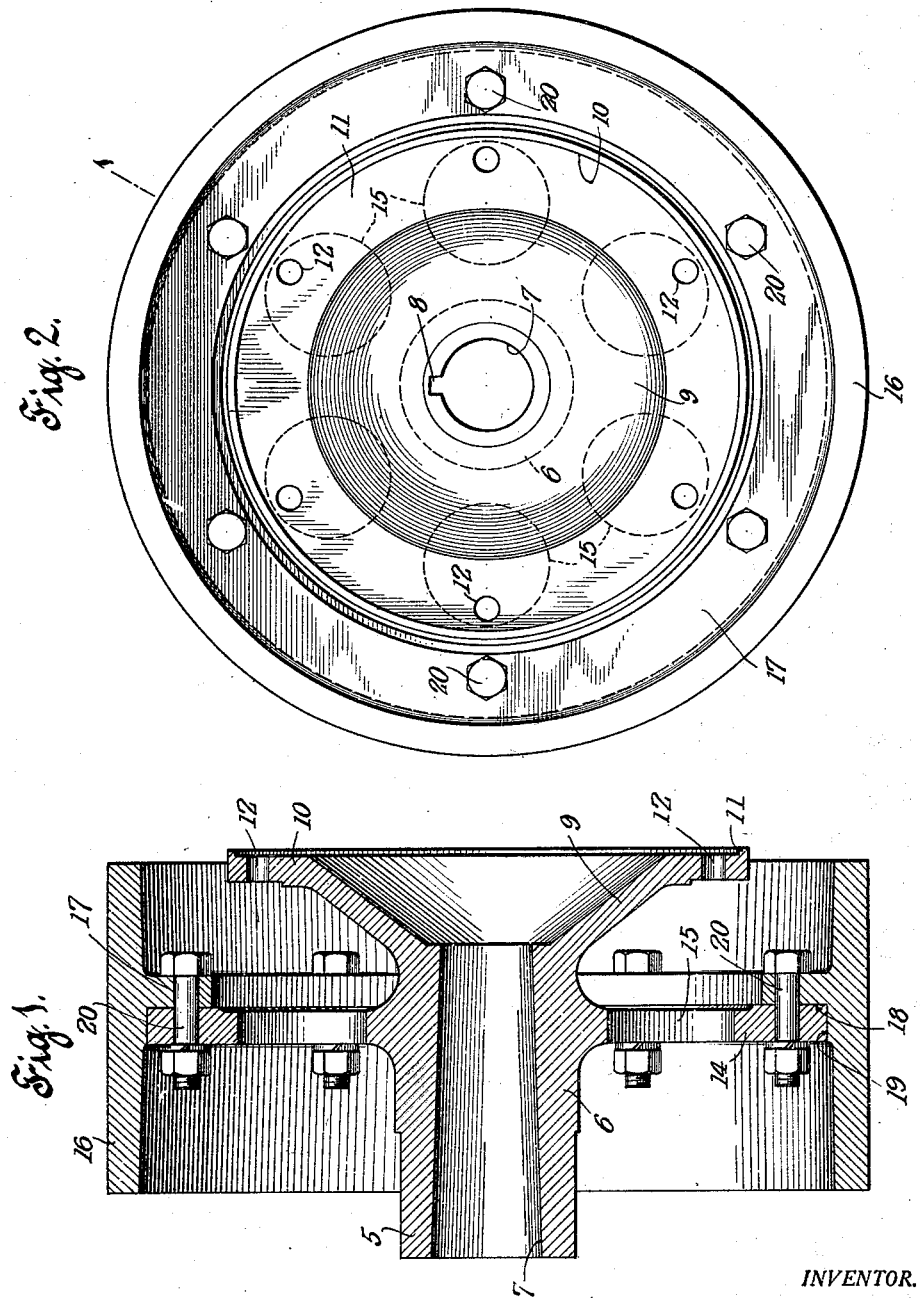

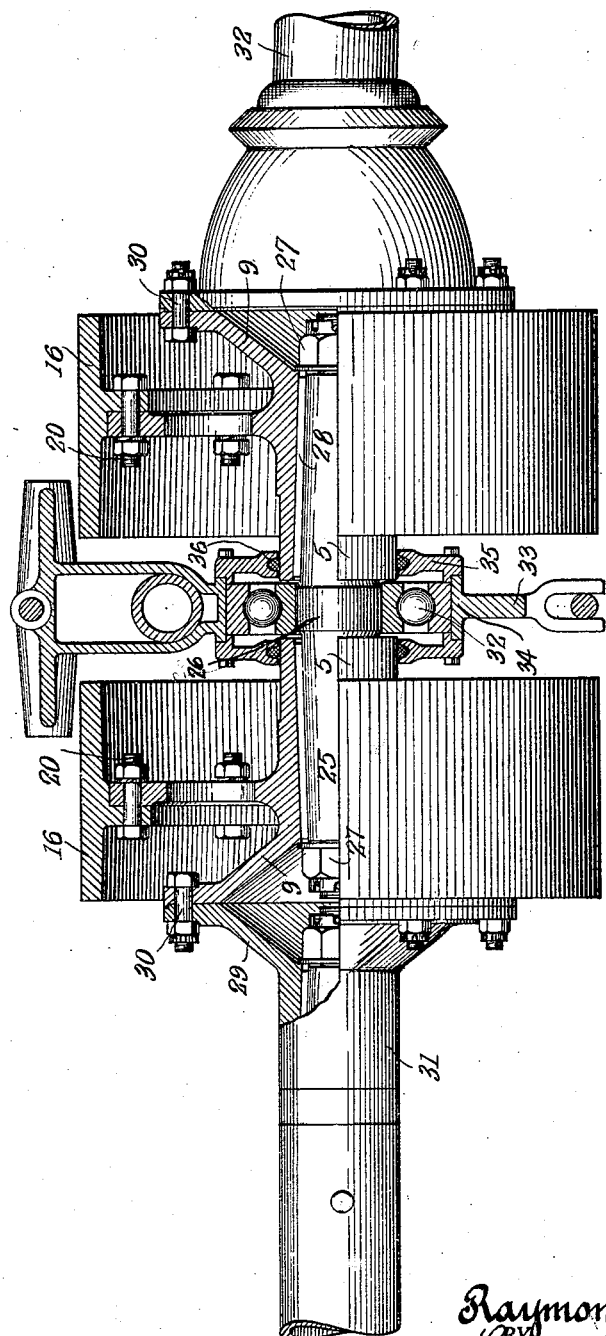

1,730,492

UNITED STATES PATENT OFFICE

RAYMOND L. AUMACK, OF ROSELLE, NEW JERSEY

DETACHABLE SHOE FOR BRAKE DRUMS

Application filed January 26, 1928. Serial No. 249,514.

This invention relates to brake drums and more particularly types employed on the transmission shafts or axles of motor vehicles, the same being an improvement over my co-pending application for patent on Brake drum for motor vehicles, filed August 13, 1927, Serial Number 212,624.

In brake drums of ordinary type it is customary to cast the drum with an integral hub connected by spokes which frequently contain flaws or cracks, due to the unequal strains imposed in cooling of the metal.

Aside from this it is a matter of considerable difficulty to produce a true axial bore in the hub, concentric with the periphery of the drum, which must be in balance within a fair degree of accuracy.

The main disadvantage is however in the fact that when the drum becomes worn to a state of questionable safety, it must be wholly discarded and another fitted in its place.

It is therefore an important object of the present invention to provide a brake drum and a flanged hub detachably engaged therein, thus permitting ready renewal of worn or damaged parts.

A further feature is in the provision of brake drums or shoes, standardized to the extent of being interchangeably secured upon a hub subject to substantially no wear, thereby effecting a high degree of economy, replacement of the drum being a simple and relatively inexpensive matter.

Another feature is to provide means for supporting the brake mechanism on the hubs of the brake drum in a manner to exclude dust and maintain proper lubrication.

These advantageous objects are accomplished by the novel design, construction and arrangement of parts hereinafter described and illustrated in the accompanying drawing, forming a component of this disclosure, and in which:—

Figure 1 is a transverse sectional view of an embodiment of the improved brake drum, the section being taken on line 1—1 of Figure 2.

Figure 2 is an end view of the same, looking from the flanged end of the hub.

Figure 3 is a side elevational view showing a complete assemblage, parts being broken away to disclose the construction.

The hubs shown are preferably made of steel castings having a cylindrical outer end 5 and a slightly enlarged body 6 through which is bored a tapered axial opening 7 to receive the correspondingly coned ends 25 of a connecting shaft 26 held by castelled nuts 27 at their inner end and prevented from turning by a spline 28 fitting the key-way 8 in the bore.

The opposite end of the hub body may be expanded to form a hollow cone terminating in an annular flange 10 having a flat counter-bored face 11 to engage a mating member 29 in a manner to drive the same, holes 12 being provided for bolts 30 to draw such members into intimate rigid relation.

Midway in the length of the hub body 6 is another annular outstanding flange 14, which may contain openings 15 to reduce weight, the outer portion of the flange being thickened and faced, while its periphery is finished to a predetermined diameter, this thickened portion being provided with bolt holes as indicated.

Obviously the hub may be machine finished all over if desired and can be accurately balanced, all parts being symmetrical.

The drum consists of a cylindrical casting 16, machined truly round on its face, its edges being also rendered smooth and level.

An inreaching flange 17 is faced upon said side 18 at least, the flange being to one side of the center of the length of the cylinder, the longer side 19 being thickened and accurately bored to receive the hub flange 14 which is drawn against the drum flange 17 by a plurality of bolts 20 provided with nuts and lock washers as shown.

From the foregoing it will be seen that when the drum 16 becomes worn or disabled, the bolts 20 may be taken out, releasing the drum and flange to be replaced by a new one, the bore 19 and holes for the bolts 20 being maintained to gage whereby interchangeability is assured, and it will be apparent that the cost of such replacement is far less than that of an integral drum and hub.

In the general assembly view shown in

Figure 3, driving and driven shafts respectively 31 and 32 are indicated as being connected by the bolts 30 and mounted on the central cylindrical portion of the shaft 26 is an annular anti-friction bearing 32 carrying a frame 33 used in supporting and guiding brake elements of the usual type.

A cage 34, forming part of the frame encircles the bearing 32 and secured on opposite sides of the cage are plates 35 provided with openings to receive the inreaching ends of the hubs 5, which as before noted are smoothly machined.

Set in the thickened marginal portion of the plates surrounding the openings are packings 36, bearing directly upon the surfaces of the hubs, thus acting to prevent the egress of any lubricant applied to the bearing and also the entrance of dust and grit to the bearing, thereby prolonging its usefulness.

It is to be understood that the specific shape of the hub body, bore or connection is immaterial, depending upon existing conditions and also the relative sizes and proportions may vary from those shown without departing from the spirit of the invention as denoted by the appended claims.

Having thus described my invention, what I claim as new and desire to secure by Letters Patent, is:—

1. A brake drum comprising a cylinder having a bore and a faced internal flange at the end of the bore, a hub having axial means to receive a drive shaft and connections to engage a mating member, an outreaching annular flange on said hub to fit the bore of said cylinder, and clamping means to draw said flanges into rigid relation.

2. A brake drum comprising a hollow cylindrical body having an inreaching flange offset from the center, said body being interiorly thickened adjacent its flange on the longer side, said thickened portion being bored and said flange faced, a hub having an axial bore and being of a length at least equal to the length of said cylinder, an annular outstanding flange on said hub close fitted to the cylinder bore and faced to seat against the face of the cylinder flange, and a plurality of bolts to clamp said flanges rigidly together.

3. A brake drum comprising a cylinder having a bore and a faced internal flange at the end of the bore, a hub constituting one element of a drive shaft having an axial bore throughout the greater part of its length, a hollow conical element terminating in a faced flange on said hub beyond the bore, an outstanding flange midway its length, said flange fitting the bore of said cylinder, and removable means to retain said flanges in rigid engagement.

4. The combination with a pair of brake drums, outstanding annular flanges on which said drums are removably engaged, said flanges having elongated hubs extending into proximity past the edges of said drums and containing conical bores, a shaft fitted to said hubs, means to secure the shaft therein, brake mechanism rotatably mounted on said shaft intermediate said drums, and wipers associated with said mechanism to bear upon the inner extending ends of said hubs.

5. The combination with a pair of brake drums, outstanding annular flanges on which said drums are removably engaged, said flanges having elongated hubs extending into proximity past the edges of said drums and containing conical bores, a shaft fitted to said hubs, means to secure the shaft therein, flanges on the opposite ends of said hubs to extend at least flush with the outer edges of said drums, a driving and a driven shaft removably engaged with the respective flanges, a connecting shaft fixed in the adjacent ends of the hubs, brake mechanism including an anti-friction bearing mounted on said connecting shaft, side plates at the bearing, said plate having an annularly recessed opening, and packings in the recesses to bear upon the inreaching ends of said hubs.

This specification signed this 18th day of January, 1928.

RAYMOND L. AUMACK.